United States Patent [19]

Moriya

[11] Patent Number: 5,772,806
[45] Date of Patent: Jun. 30, 1998

[54] PNEUMATIC TIRES

[75] Inventor: Masashiro Moriya, Tokyo, Japan

[73] Assignee: Bridgestone Corporation, Tokyo, Japan

[21] Appl. No.: 540,184

[22] Filed: Oct. 6, 1995

[30] Foreign Application Priority Data

Oct. 6, 1994  [JP]  Japan ................................... 6-242939

[51] Int. Cl.$^6$ .................................................. B60C 11/12
[52] U.S. Cl. ................................. 152/209 R; 152/209 D; 152/DIG. 3
[58] Field of Search ........................... 152/209 R, 209 D, 152/DIG. 3

[56] References Cited

U.S. PATENT DOCUMENTS

| 4,726,407 | 2/1988 | Hayakawa et al. | 152/209 R |
| 5,343,918 | 9/1994 | Fontaine | 152/209 R |
| 5,385,189 | 1/1995 | Aoki et al. | 152/209 R |

FOREIGN PATENT DOCUMENTS

| 1-101205 | 4/1989 | Japan . | |
| 1-95913 | 4/1989 | Japan . | |
| 197402 | 8/1990 | Japan | 152/209 R |
| 267009 | 10/1990 | Japan | 152/209 D |
| 2-310109 | 12/1990 | Japan . | |
| 310108 | 12/1990 | Japan | 152/209 D |
| 279006 | 12/1991 | Japan | 152/209 D |
| 169917 | 7/1993 | Japan | 152/209 D |
| 143943 | 5/1994 | Japan | 152/209 R |

OTHER PUBLICATIONS

Patent Abstracts of Japan, vol. 018, No. 453, Aug 24, 1994.
Patent Abstracts of Japan, vol. 015, No. 097, Mar. 8, 1991.
Patent Abstracts of Japan, vol. 017, No. 217, Apr. 28, 1993.
Patent Abstracts of Japan, vol. 013, No. 305, Jul. 13, 1989.

*Primary Examiner*—Steven D. Maki
*Attorney, Agent, or Firm*—Sughrue, Mion, Zinn, Macpeak & Seas, PLLC

[57] ABSTRACT

This invention provides pneumatic tires having improved wet performance without degrading resistance to uneven wear. A pneumatic tire having a plurality of main grooves and a large number of sipes extending between adjacent main grooves and opening to both grooves is characterized in that the sipe has substantially uniform width in the depth direction at the both end portions opening to the main grooves, and has an expanded width portion at the bottom of the sipe at at least the greater part of the remaining portion except for the uniform width portion.

12 Claims, 5 Drawing Sheets

FIG. 3(a) PRIOR ART  FIG. 3(b) PRIOR ART
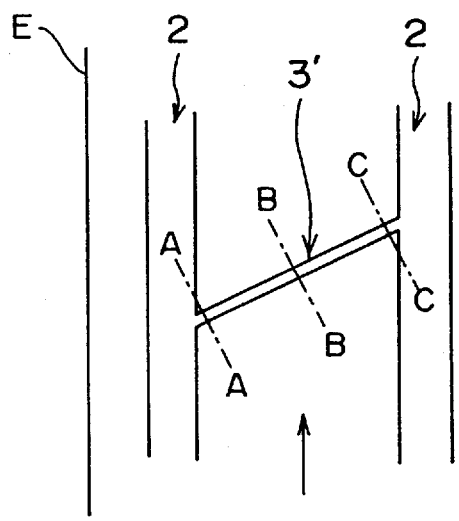
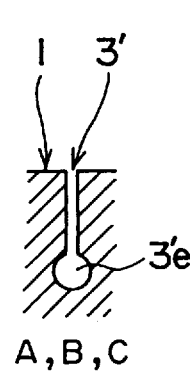
FIG. 3(c) PRIOR ART
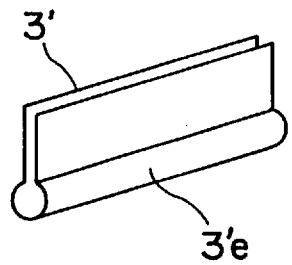
FIG. 4(a)  FIG. 4(b)  FIG. 4(c)
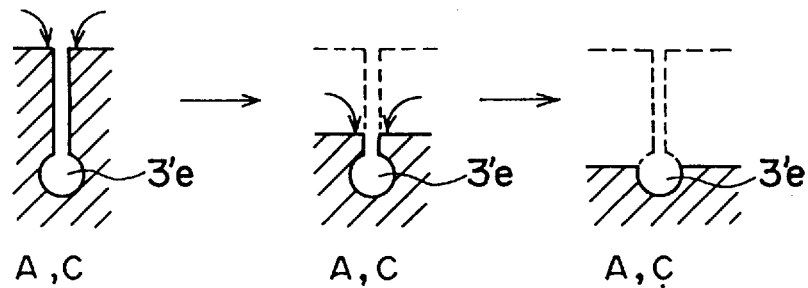

PNEUMATIC TIRES

BACKGROUND OF THE INVENTION

1. Field of the Invention

This invention relates to pneumatic tires, and in particular to pneumatic tires having a plurality of main grooves and a large number of sipes extending between adjacent main grooves and opening to both grooves. More especially, it relates to pneumatic tires having improved wet performance together with restrained uneven wear of the rubber near the sipes after the middle stage of use has occurred as well as in a new tire.

2. Description of the Prior Art

Conventional sipes have a sectional shape like thin plates having uniform width of up to a few millimeters both in the longitudinal direction and in the depth direction and wherein the bottom of the sipe may have a rounded shape when viewed in section. A plurality of sipes of this type are formed in a tread rubber together with main grooves, whereby wet performance on wet road surfaces can be generally improved.

These sipes, however, do not display sufficient wet performance after the middle stage of wear has occurred. Therefore, in order to overcome this problem, for example Japanese Laid Open No. 1-95913 discloses a sipe having a tube-like space at the bottom of the sipe which is effective to improve the above problem, and Japanese Laid Open No. 2-310109 discloses a flask type sipe whose bottom is expanded in a widthwise direction of the sipe. Sipes of the type according to the Japanese Laid Open Nos. 1-95913 and 2-310109 are shown in FIG. 3(*a*), (*b*) and (*c*) of the accompanying drawings.

FIG. 3(*a*) shows a portion of a tread surface 1 wherein a sipe 3' extends between straight main grooves 2 extending in parallel with the tread center line E. The sectional shape of the sipe 3' along each of the lines A—A, B—B and C—C located at both end portions opening to the main grooves 2 or at the center portion of the sipe has an expanded width portion 3'e of uniform width along the sipe 3' between the end portions as shown in FIG. 3(*b*). FIG. 3(*c*) is a perspective view of the whole sipe 3' viewed along the arrow in FIG. 3(*a*).

It has been confirmed that, after the middle stage of wear, when wet performance tends to be lowered, because flask type sipes 3' operate to cut the water skin on the road surface and remove water from the ground contacting area, flask sipes significantly contribute to improve the wet performance of a tire. The effect of the sipes 3' in this regard is not of course as great as that of the main grooves, but the provision of a large number of sipes 3' has a significant effect.

Because the sipe 3' has the expanded width portion at the bottom thereof, however, the sipes 3' in the contacting area exhibit larger transformation (as shown by arrows in FIG. 4) at both end portions than sipes of thin plate shape at both end portions under contacting pressure, braking force and traction force during the change from new tire (FIG. 4(*a*)) to the middle stage of wear (FIG. 4(*b*)) and further to last stage of wear (FIG. 4(*c*)). Therefore flask type sipes 3' bring about uneven wear in the tread rubber at the end portion of the sipe 3'. This uneven wear is serious in radial ply tires and proceeds to reach the expanded width portions of the sipes.

It is an object of the present invention to provide a pneumatic tire wherein uneven wear around the sipes formed in the tread is effectively prevented and wherein good wet performance running on a wet road surface can be retained.

SUMMARY OF THE INVENTION

The present invention provides a pneumatic tire having a plurality of main grooves and a large number of sipes extending between adjacent main grooves and opening to both grooves, characterized in that the sipe has substantially uniform width in the depth direction at the both end portions opening to the main grooves, and has an expanded width portion at the bottom of the sipe at at least the greater part of the remaining portion except for the uniform width portion.

In this invention, it is preferable that the sipe has a portion with uniform width in the depth direction intermediate the end portions of the sipe, and that the longitudinal length of the uniform width portion at the bottom of the sipe is 0.2–3.0 mm. The main grooves may comprise circumferential main grooves, or slant main grooves. The main grooves may comprise circumferential main grooves and slant main grooves slantwise extending with respect to the circumference of the tread wherein the sipes may extend to connect a circumferential groove and a slant main groove.

BRIEF DESCRIPTION OF THE DRAWINGS

FIG. 1(*b*) is a side sectional view of the tread in FIG. 1(*a*) along lines A—A, B—B, C—C, (C')—(C'), D—D and E—E;

FIG. 1(*c*) and FIG. 1(*d*) are perspective views of different sipe embodiments from the upward arrow in FIG. 1(*a*);

FIG. 3(*a*) is an explanatory plan view of a tread with a known type of sipe applied to a conventional pneumatic tire;

FIG. 3(*b*) is a side sectional view of the sipe 3' in FIG. 3(*a*);

FIG. 3(*c*) is a perspective view of the sipe 3' in FIG. 3(*a*) from the upward arrow in FIG. 3(*a*);

FIG. 4(*a*) is a drawing side view to explain the force operating on the sipe shown in FIG. 3;

FIG. 4(*b*) is a side view of the sipe in FIG. 3 at a middle stage of wear;

FIG. 4(*a*) is a side view of the sipe in FIG. 3 at the last stage of wear;

DESCRIPTION OF THE PREFERRED EMBODIMENTS

This invention will be explained first with reference to FIGS. 1(*a*), (*b*), (*c*) and (*d*).

Figure 1:
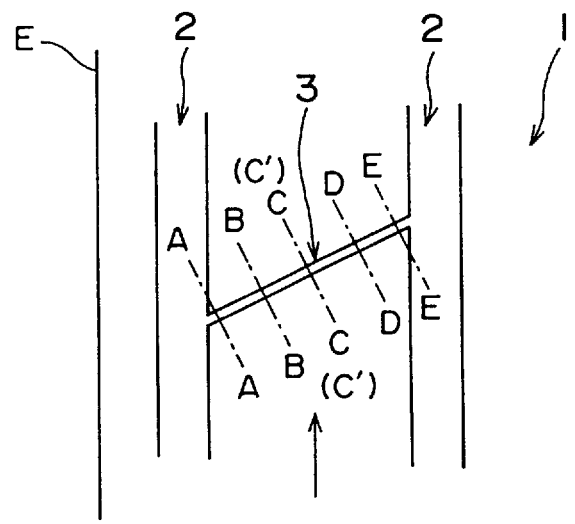
FIG. 1(*a*) is an explanatory plan view of a tread with sipes applied to a pneumatic tire of this invention.

FIG. 1(*a*) shows a part of a tread surface, and FIG. 1(*b*) shows sectional views taken along lines A—A, B—B, C—C, (C')—(C'), D—D and E—E in FIG. 1(*a*) where A indicates the line A—A, B indicates the line B—B, and in the same manner with C, (C), D and E. FIGS. 1(*c*) and 1(*d*) are perspective views of different embodiments of the entire sipe formed in the tread rubber viewed along the arrow in FIG. 1(*a*).

FIG. 1(a) shows a tread surface 1, main grooves 2, and a sipe 3. The sipe 3 extends between adjacent main grooves 2 and opens to both main grooves 2. Although only one sipe 3 is indicated in this drawing, many sipes 3 are formed in the tread surface. The reference letter E in the drawing designates the equatorial plane of the tread surface.

Figure 1B:
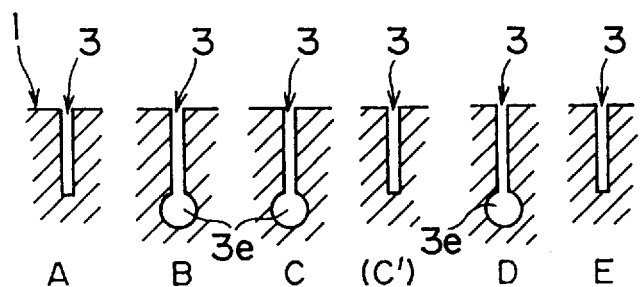

The sipe 3 has a uniform width in the depth direction at the end portions opening to the main grooves 2 as shown in the sectional views A and E in FIG. 1(b). At least the greater part of the remaining portion except for the end portions of the sipe has a portion 3e having an expanded width at the bottom of the sipe as shown in the sectional views B, C and D in FIG. 1(b), so that the sipe 3 has a composite sipe shape as shown in FIG. 1(c).

Figure 1C:
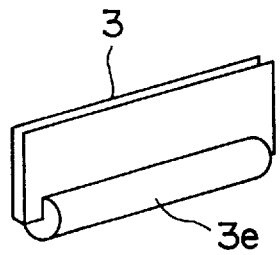
Figure 1D:
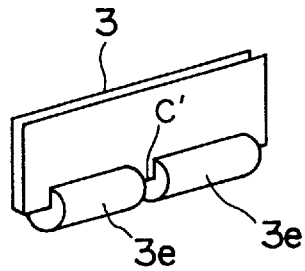

"The clause at least the greater part of the remaining portion" mentioned above means that, in another embodiment of the invention as shown in FIG. 1(d), a portion c' having uniform width in the depth direction can be formed with relatively short longitudinal length in the remaining portion except for the end portions of the sipe, as shown in the sectional view (C') in FIG. 1(b) which is along the line C—C in the center of the sipe in FIG. 1(a), in addition to the embodiment wherein the expanded width portion 3e is formed along the entire remaining portion as shown in the sectional view C in FIG. 1(b). FIG. 1(d) is a perspective view of a sipe having the portion c'. A plurality of portions c' can be formed between the end portions of the sipe, if desired.

In FIG. 1(a), there are shown two straight circumferential main grooves 2, but there can be three or more main grooves in the tread, and/or the main grooves can be zig-zag shape circumferential main grooves. The main grooves can be slant main grooves extending from the center portion of the tread toward the tread end. In the case where the main grooves in the tread mostly comprise slant main grooves, the slant angle is preferably 5°–60° with respect to the equatorial plane. The main grooves can comprise circumferential main grooves and slant main grooves extending slantwise with respect to the circumference of the tread, the line E in FIG. 1(a), and the above described sipes can be formed between a circumferential main groove and a slant main groove.

Figure 2A:
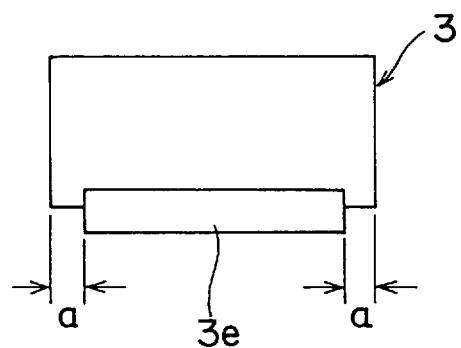
FIGS. 2(*a*) and 2(*b*) are front views of the sipes shown in FIGS. 1(*c*) and 1(*d*) respectively.
Figure 2B:
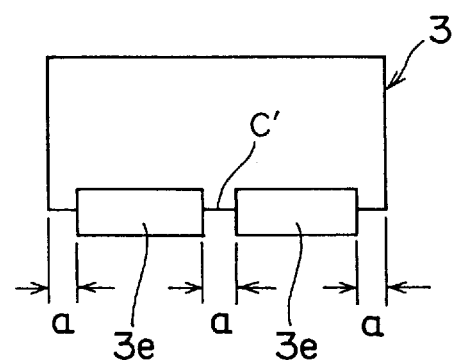

FIGS. 2(a) and 2(b) are front views of the sipes 3 respectively shown in FIGS. 1(c) and 1(d). It is preferable that a longitudinal length a at the bottom of the portion having uniform width in the depth direction is 0.2–3.0 mm.

Figure 7:
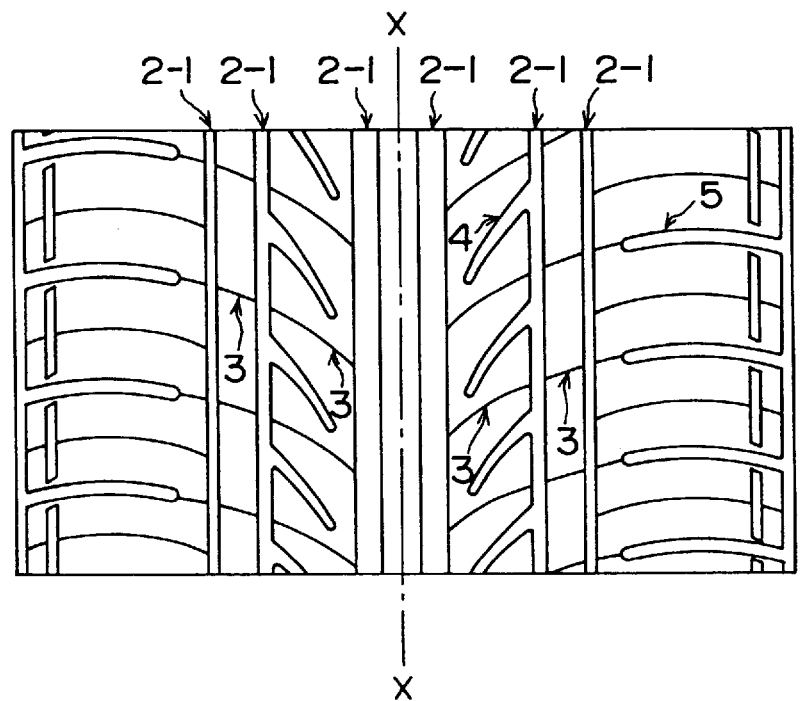
FIG. 7 is a plan view showing the tread pattern applied to a pneumatic tire of this invention.

A tread pattern of a tire of this invention is shown in FIG. 7. This tread is provided with six straight circumferential main grooves 2-1 and a series of slant grooves 4 and 5. Sipes 3 according to this invention are formed to extend between adjacent main grooves 2.

Figure 8:
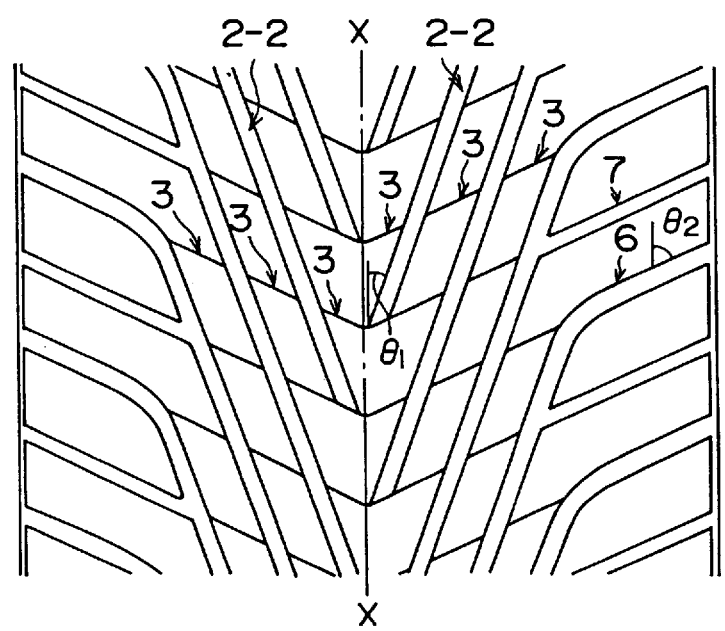
FIG. 8 is a plan view showing another tread pattern applied to a pneumatic tire of this invention.

Another tread pattern of a tire of this invention is shown in FIG. 8. This tread is provided with a series of slant main grooves 2—2 extending from near the equatorial plane X toward the tread ends at an angle θ1 of 20° with respect to the equatorial plane X, and a series of slant main grooves 6 and 7 connecting to the slant main grooves 2—2 and extending at an angle θ2 of 65° with respect to the equatorial plane X. Sipes according to this invention are formed to extend between adjacent slant main grooves 2-2.

The above described sipes 3 can be applied to either bias ply radial tires or radial ply tires, in particular to radial ply tires for passenger cars, trucks and buses. These radial tires comprise a pair of bead portions, a pair of sidewall portions and a tread between the side walls, and have a radial ply carcass extending between bead cores embedded in the bead portions, a belt reinforcing the tread portion and a tread rubber arranged on the belt.

Figure 5A:
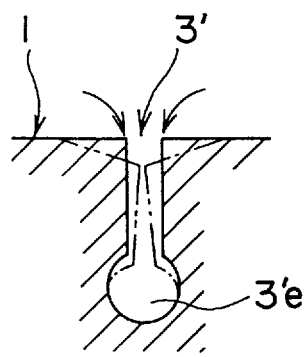
FIGS. 5(*a*) and 5(*b*) are side views to explain the transformation of the sipes shown in FIG. 1 and FIG. 3.
Figure 5B:
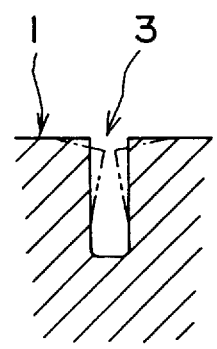

FIG. 5 shows opening portions of sipes 3' and 3 opening to main grooves 2 respectively in FIG. 5(a) and in FIG. 5(b). A conventional flask sipe 3' shown in FIG. 5(a) opens to both main grooves and its bottom 3'e is expanded, and therefore the tread rubber around the end portion of the sipe 3' opening to the groove is weak against external force, so that the worn rubber volume is larger than at other portions because of the large transformation as shown in the drawing caused by braking force and traction force or cornering force.

In the case of radial ply tires having a highly rigid belt between the tread rubber and the carcass ply, local wear develops during travelling by a process resulting in uneven wear occurring at an interval of the sipes 3' that is called heel and toe wear.

On the contrary, the end portion of the composite sipe 3 connecting to the main grooves 2 has uniform width in the depth direction, and therefore the above mentioned local wear is restrained. Thus, the disadvantage of the above-mentioned wear process in the radial ply tire is avoided and the occurrence of heel and toe wear is markedly restrained.

Most of the remaining portion except the uniform width portion in the sipe 3 has the extended width portion 3e at the bottom, and therefore the tire displays good wet performance during the period from the beginning stage to the last stage of tread wear. When the sipe is comparatively long, a portion having uniform width in the depth direction as shown in sectional view (C') along the line C—C in FIG. 1 can be formed at the middle of the sipe in the longitudinal direction, whereby uneven wear is further effectively improved.

When the sipes 3 are formed between the circumferential main grooves and slant main grooves, a variety of tread patterns can be obtained without occurrence of uneven wear. In particular for passenger cars, when the length a of the uniform width portion at the bottom of the sipe 3 is 0.2–3.0 mm, it is possible to suitably balance the wet performance and resistance to uneven wear.

An embodiment of this invention is a radial ply tire for a passenger car having a size of 205/65R15 and a tread pattern as shown in FIG. 7, wherein the width of the sipe 3 at the surface 1 is 0.5 mm, the maximum diameter of the expanded portion 3e is 1.5 mm, the length a of the uniform width portion at the bottom is 1.5 mm, and the shape of the expanded portion 3e of the sipe 3 is as shown in FIG. 2(a). On the other hand, there were prepared a conventional tire having the same structure except that sipes have a thin plate shape with uniform width along the whole sipes, and a comparative tire having the same structure except having sipes as shown in FIG. 3. Then these test tires, mounted on a vehicle, were examined with respect to uneven wear volume, steering stability on wet road surface and braking performance on wet road surface.

Figure 6:
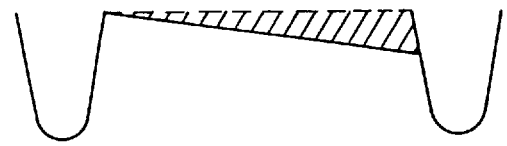
FIG. 6 is a drawing to explain heel and toe wear.

Uneven wear volume was evaluated by measuring heel and toe wear volume as shown in FIG. 6 which shows a side view of a block when the volume became maximum in use. Steering stability on a wet road surface was evaluated by feeling of a driver driving on a wet road surface over a test course when the expanded width portions of each tire appear on the tire surface, with respect to the invention tire and comparative tire, and with respect to the conventional tire when the tire runs the same mileage as the invention tire. Braking performance on wet a road surface was evaluated by distance between braking point and stopping point when running in the same manner as the steering stability test. Each result was indicated by index value on the basis of the conventional tire as 100, and the larger is the value, the better is the evaluation. The results obtained are indicated in Table 1.

TABLE 1

|  | Conventional embodiment | Comparative embodiment | Embodiment of Invention |
|---|---|---|---|
| Steering stability on wet road | 100 | 105 | 105 |
| Braking performance on wet road | 100 | 105 | 105 |
| Heel and toe wear volume | 100 | 80 | 95 |

According to Table 1, the embodiment tire of the invention has improved wet performance in comparison with the conventional tire and a deterioration of heel and toe wear (by 5 points) that is not however a problem in actual use. On the other hand, the deterioration of heel and toe wear volume of the comparative tire (by 20 points) is sufficiently large that it cannot be ignored.

According to this invention, there are provided pneumatic tires having good wet performance without significantly decreasing resistance to uneven wear.

While the invention has been particularly shown and described with reference to certain preferred embodiments thereof, it will be understood by those skilled in the art that various changes and modifications may be made without departing from the spirit and scope of the invention.

I claim:

1. A pneumatic tire having a tread, said tread comprising; plurality of main grooves and sipes extending between adjacent main grooves, each of said sides having a substantially uniform width at a tread surface and having a first end portion opening to one of the adjacent grooves, a second end portion opening to the other of the adjacent grooves and a remaining portion between the first end portion and the second end portion, wherein each of said sipes has a substantially uniform width along its entire depth at the first end portion and the second end portion and said substantially uniform width extending to a first depth in said first and second end portions, each of said sipes has an expanded width portion at the bottom of the sipe compared to said substantially uniform width at least at a greater part of a remaining portion which extends to a second depth and does not have an expanded width at the bottom of the sipe at the first end portion and the second end portion, wherein said second depth is greater than said first depth.

2. The pneumatic tire according to claim 1, wherein each of said sipes has a substantially uniform expanded width portion intermediate the adjacent main grooves except for the first and second end portions.

3. The pneumatic tire according to claim 2, wherein the main grooves comprise circumferential main grooves extending in the circumferential direction of the tread.

4. The pneumatic tire according to claim 2, wherein the main grooves comprise slant main grooves extending slantwise with respect to the circumferential direction of the tread.

5. The pneumatic tire according to claim 2, wherein the main grooves comprise circumferential main grooves extending in the circumferential direction of the tread and slant main grooves extending slantwise with respect to the circumferential direction, and wherein the sipes extend between a circumferential groove and a slant main groove.

6. The pneumatic tire according to claim 5 wherein each of said sipes extend in a straight line between circumferential groove and a slant main groove.

7. The pneumatic tire according to claim 2, wherein the length of the bottom of the uniform width portions of the sipe is 0.2–3.0 mm.

8. The pneumatic tire according to claim 1, wherein the main grooves comprise circumferential main grooves extending in the circumferential direction of the tread.

9. The pneumatic tire according to claim 1, wherein the main grooves comprise slant main grooves extending slantwise with respect to the circumferential direction of the tread.

10. The pneumatic tire according to claim 1, wherein the main grooves comprise circumferential main grooves extending in the circumferential direction of the tread and slant main grooves extending slantwise with respect to the circumferential direction, and wherein the sipes extend between a circumferential groove and a slant main groove.

11. The pneumatic tire according to claim 1, wherein the length of the bottom of the uniform width portions of the sipe is 0.2–3.0 mm.

12. The pneumatic tire according to claim 1 wherein each of said sipes extends in a straight line between adjacent main grooves.

* * * * *